US011669997B2

(12) United States Patent
Miyashita et al.

(10) Patent No.: US 11,669,997 B2
(45) Date of Patent: Jun. 6, 2023

(54) IMAGE PROCESSING SYSTEM, IMAGE PROCESSING METHOD, AND STORAGE MEDIUM

(71) Applicants: EVIDENT CORPORATION, Nagano (JP); TOKYO INSTITUTE OF TECHNOLOGY, Tokyo (JP)

(72) Inventors: Naoyuki Miyashita, Tokorozawa (JP); Masatoshi Okutomi, Tokyo (JP); Sho Kagami, Yokohama (JP)

(73) Assignees: Evident Corporation; Tokyo Institute of Technology, Tokyo (JP)

( * ) Notice: Subject to any disclaimer, the term of this patent is extended or adjusted under 35 U.S.C. 154(b) by 240 days.

(21) Appl. No.: 17/330,827

(22) Filed: May 26, 2021

(65) Prior Publication Data

US 2021/0374990 A1  Dec. 2, 2021

(30) Foreign Application Priority Data

Jun. 1, 2020  (JP) .............................. JP2020-095271

(51) Int. Cl.
*G06T 7/70* (2017.01)
*G06T 7/73* (2017.01)
(Continued)

(52) U.S. Cl.
CPC ................. *G06T 7/73* (2017.01); *G06T 7/62* (2017.01); *G06T 17/10* (2013.01); *H04N 23/50* (2023.01);
(Continued)

(58) Field of Classification Search
CPC .. G06T 7/73; G06T 7/62; G06T 17/10; G06T 2207/10068; H04N 23/50; H04N 23/555
See application file for complete search history.

(56) References Cited

U.S. PATENT DOCUMENTS 8,462,105 B2 *  6/2013  Kobayashi .............. G06F 3/038
                                             345/156
8,770,051 B2 *  7/2014  Stamenkovic ........... G01B 7/13
                                             73/866.5
(Continued)

FOREIGN PATENT DOCUMENTS

JP       2010243273 A   * 10/2010
JP       2017-167601 A    9/2017
(Continued)

OTHER PUBLICATIONS

Moritz v. Wrangel, Markus Kästner, Eduard Reithmeier, "Robust counting of engine blades in aircraft engine video endoscopy," Proc. SPIE 12098, Dimensional Optical Metrology and Inspection for Practical Applications XI,120980C (May 31, 2022); doi: 10.1117/12.2618504.*

(Continued)

*Primary Examiner* — Shefali D Goradia
(74) *Attorney, Agent, or Firm* — Scully, Scott, Murphy & Presser, P.C.

(57) ABSTRACT

An image processing system, which estimates a position and a pose of a camera and performs three-dimensional reconstruction processing of an object having a cylindrical shape by using a photographed image acquired by photographing an inside of the object with the camera, includes a processor. The processor estimates a first center axis of the cylindrical shape by using a group of three-dimensional points obtained by reconstructing, in a three-dimensional space, a group of feature points extracted from the photographed image. In addition, the processor performs bundle adjustment for correcting the position and the pose of the camera and the coordinates of the group of three-dimensional points by using a condition for minimizing a total sum of differences between a radius of the cylindrical shape and respective (Continued)

distances from the first center axis to individual three-dimensional points that constitute the group of three-dimensional points.

7 Claims, 6 Drawing Sheets

(51) Int. Cl.
    *G06T 17/10*     (2006.01)
    *G06T 7/62*     (2017.01)
    *H04N 23/50*     (2023.01)

(52) U.S. Cl.
    CPC .. *G06T 2207/10068* (2013.01); *H04N 23/555* (2023.01)

(56) References Cited

U.S. PATENT DOCUMENTS

| | | | |
|---|---|---|---|
| 10,001,369 B2* | 6/2018 | Yin | H04N 13/282 |
| 2013/0207965 A1* | 8/2013 | Hori | G06T 7/33 345/419 |
| 2014/0148939 A1* | 5/2014 | Nakano | G01B 11/2513 700/166 |
| 2018/0046885 A1* | 2/2018 | Barker | G06V 10/245 |
| 2019/0005662 A1* | 1/2019 | Hirakawa | G06T 7/73 |

FOREIGN PATENT DOCUMENTS

| | | | |
|---|---|---|---|
| WO | WO-2005050558 A2 * | 6/2005 | ......... G01N 15/1468 |
| WO | WO2005/077253 A1 | 8/2005 | |

OTHER PUBLICATIONS

Schonberger, Johannes L. et al., "Structure-from-motion revisited", Proceedings of the IEEE Conference on Computer Vision and Pattern Recognition (2016), cited in spec on p. 2.

Mur-Artal, Raul et al., "ORB-SLAM: a versatile and accurate monocular SLAM system", IEEE transactions on Yobotics 31.5 (2015), pp. 1147-1163, cited in spec on p. 2.

Fischler, M. A. et al., "Random sample consensus: a paradigm for model fitting with applications to image analysis and automated cartography", Comm. ACM (1981), vol. 24, No. 6, pp. 381-395, cited in spec on p. 15.

Lopez-Escogido, D. et al., "Automatic extraction of geometric models from 30 point cloud datasets" in Proc. Electrical Engineering, Computing Science and Automatic Control (CCE) (2014), cited in spec on p. 14.

Strasdat, Hauke et al., "Scale Drift-Aware Large Scale Monocular SLAM" (http://roboticsproceedings.org/rss06/p10.pdf).

* cited by examiner

IMAGE PROCESSING SYSTEM, IMAGE PROCESSING METHOD, AND STORAGE MEDIUM

CROSS REFERENCE TO RELATED APPLICATION

This application claims benefit of Japanese Application No. 2020-95271 filed in Japan on Jun. 1, 2020, the contents of which are incorporate by this reference.

BACKGROUND OF THE INVENTION

1. Field of the Invention

The present invention relates to an image processing system, an image processing method, and a storage medium.

2. Description of the Related Art

Industrial endoscopes are widely used for non-destructively inspecting the inside of pipes for chemical refineries, gas distribution, sewer maintenance, etc. When a defect such as a flaw, corrosion, or the like is found, it is necessary to change a measure for dealing with the defect depending on the degree thereof. Therefore, it is important to know an exact size and location of a defective part inside a pipe. In an endoscopic inspection, an image pickup optical system provided at a distal end of a probe is used to pick up an image of an inside of an object and acquire an inspection image. Since such a probe generally has a diameter of about several millimeters, it is not desirable to provide the probe with a physical component for measurement and pose detection (motion sensor or the like), in view of the mounting area and the cost.

Meanwhile, in recent years, not only in the fields of endoscopes but also in other fields, methods such as Structure-from-Motion (SfM) and Visual-Simultaneous Localization and Mapping (V-SLAM) have been actively employed as methods for obtaining an object shape and a camera position using images acquired from an image pickup apparatus. These methods are proposed, for example, in Schonberger, Johannes L., and Jan-Michael Frahm. "Structure-from-motion revisited." Proceedings of the IEEE Conference on Computer Vision and Pattern Recognition. 2016, and Mur-Artal, Raul, Jose Maria Martinez Montiel, and Juan D. Tardos. "ORB-SLAM: a versatile and accurate monocular SLAM system." IEEE transactions on robotics 31.5 (2015): pp. 1147-1163.

When the method like SfM or V-SLAM is used in a pipe inspection with an industrial endoscope, information according to a relative positional relation between a pipe as an object to be inspected existing in a real space and an image pickup section provided in an endoscope to be inserted into the pipe is acquired, for example, and the three-dimensional shape of the pipe is sequentially reconstructed based on the acquired information. Incremental SfM as a sequential updating SfM and V-SLAM, in particular, can contribute to an improvement of inspection efficiency, since such methods enable a three-dimensional shape of a pipe to be reconstructed in real time by using images sequentially picked up by an industrial endoscope.

SUMMARY OF THE INVENTION

An image processing system according to one aspect of the present invention is an image processing system that estimates a position and a pose of a camera and performs three-dimensional reconstruction processing of an object having a cylindrical shape, by using a photographed image acquired by photographing an inside of the object with the camera. The image processing system includes a processor, and the processor estimates a first center axis of the cylindrical shape by using a group of three-dimensional points obtained by reconstructing, in a three-dimensional space, a group of feature points extracted from the photographed image. The processor further performs bundle adjustment for correcting the position and the pose of the camera and coordinates of the group of three-dimensional points by using a condition for minimizing a total sum of differences between a radius of the cylindrical shape and respective distances from the first center axis to individual three-dimensional points that constitute the group of three-dimensional points.

An image processing method according to one aspect of the present invention is a method for estimating a position and a pose of a camera and performing three-dimensional reconstruction processing of an object having a cylindrical shape, by using a photographed image acquired by photographing an inside of the object with the camera. The image processing method includes: estimating a first center axis of the cylindrical shape by using a group of three-dimensional points obtained by reconstructing, in a three-dimensional space, a group of feature points extracted from the photographed image; and correcting the position and the pose of the camera and coordinates of the group of three-dimensional points by using a condition for minimizing a total sum of differences between a radius of the cylindrical shape and respective distances from the first center axis to individual three-dimensional points that constitute the group of three-dimensional points.

A storage medium according to one aspect of the present invention is a non-transitory computer-readable storage medium that stores an image processing program for estimating a position and a pose of a camera and performing three-dimensional reconstruction processing of an object having a cylindrical shape, by using a photographed image acquired by photographing an inside of the object with the camera. The image processing program causes a computer to execute: estimating a first center axis of the cylindrical shape by using a group of three-dimensional points obtained by reconstructing, in a three-dimensional space, a group of feature points extracted from the photographed image; and correcting the position and the pose of the camera and coordinates of the group of three-dimensional points by using a condition for minimizing a total sum of differences between a radius of the cylindrical shape and respective distances from the first center axis to individual three-dimensional points that constitute the group of three-dimensional points.

DETAILED DESCRIPTION OF THE PREFERRED EMBODIMENTS

Hereinafter, an embodiment of the present invention will be described with reference to drawings.

Figure 1:
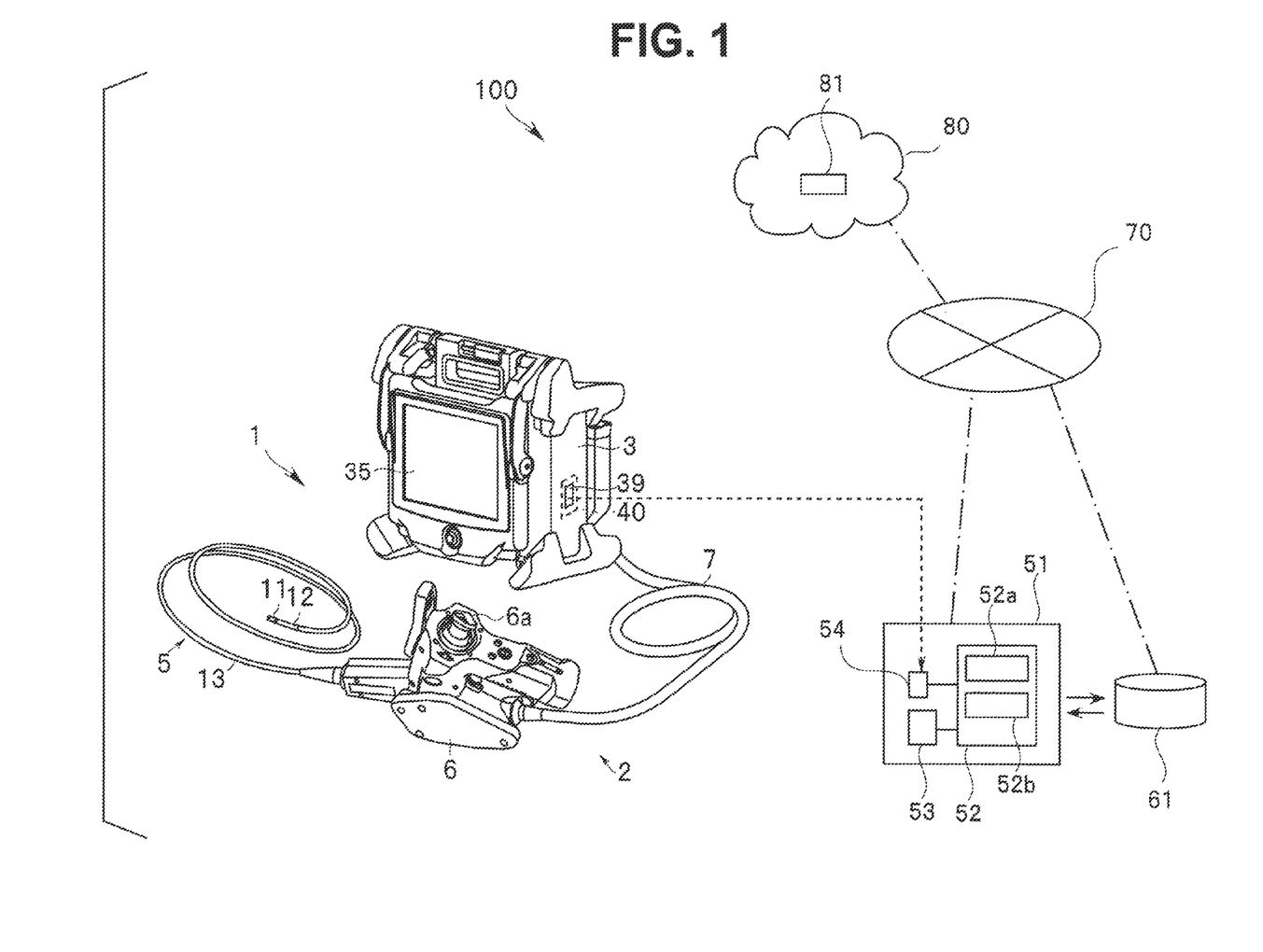
FIG. 1 is one example of a configuration view illustrating a configuration of a pipe inspection system using an image processing system according to an embodiment.

FIG. 1 is one example of a configuration view illustrating a configuration of a pipe inspection system using an image processing system according to the embodiment. A pipe inspection system 100 includes an image processing system 51 and an endoscope system 1, as illustrated in FIG. 1, for example.

The endoscope system 1 includes an endoscope 2, and a main body apparatus 3 to which the endoscope 2 is connectable, as illustrated in FIG. 1, for example. The main body apparatus 3 includes a display section 35 on which images, etc., can be displayed. Furthermore, the main body apparatus 3 is provided with a connection port 40 to which an external storage device 39 such as a USB memory is connectable. The connection port 40 is also connectable with a communication cable. In other words, the endoscope system 1 and the image processing system 51 are capable of directly transmitting and receiving data therebetween via the communication cable and also capable of exchanging data via the external storage device 39.

The endoscope 2 includes an insertion portion 5, an operation portion 6, and a universal cord 7. The insertion portion 5 is formed in an elongated shape so as to be insertable into an inside of an object to be inspected, such as a turbine, an engine, etc. The operation portion 6 is provided on the proximal end side of the insertion portion 5. The universal cord 7 is extended from the operation portion 6. The endoscope 2 is detachably connected to the main body apparatus 3 through the universal cord 7.

The insertion portion 5 includes, in the following order from the distal end side, a distal end portion 11, a bending portion 12 formed to be bendable, and a long flexible tube portion 13 having flexibility.

The operation portion 6 includes a bending operation element 6a having a joystick with which an operation for bending the bending portion 12 in desired directions can be performed. In addition, the operation portion 6 includes one or more operation buttons corresponding to one or more functions which can be used in the endoscope system 1, although not illustrated. Examples of the operation buttons include a freeze button, a bending lock button, and a recording instruction button.

Figure 2:
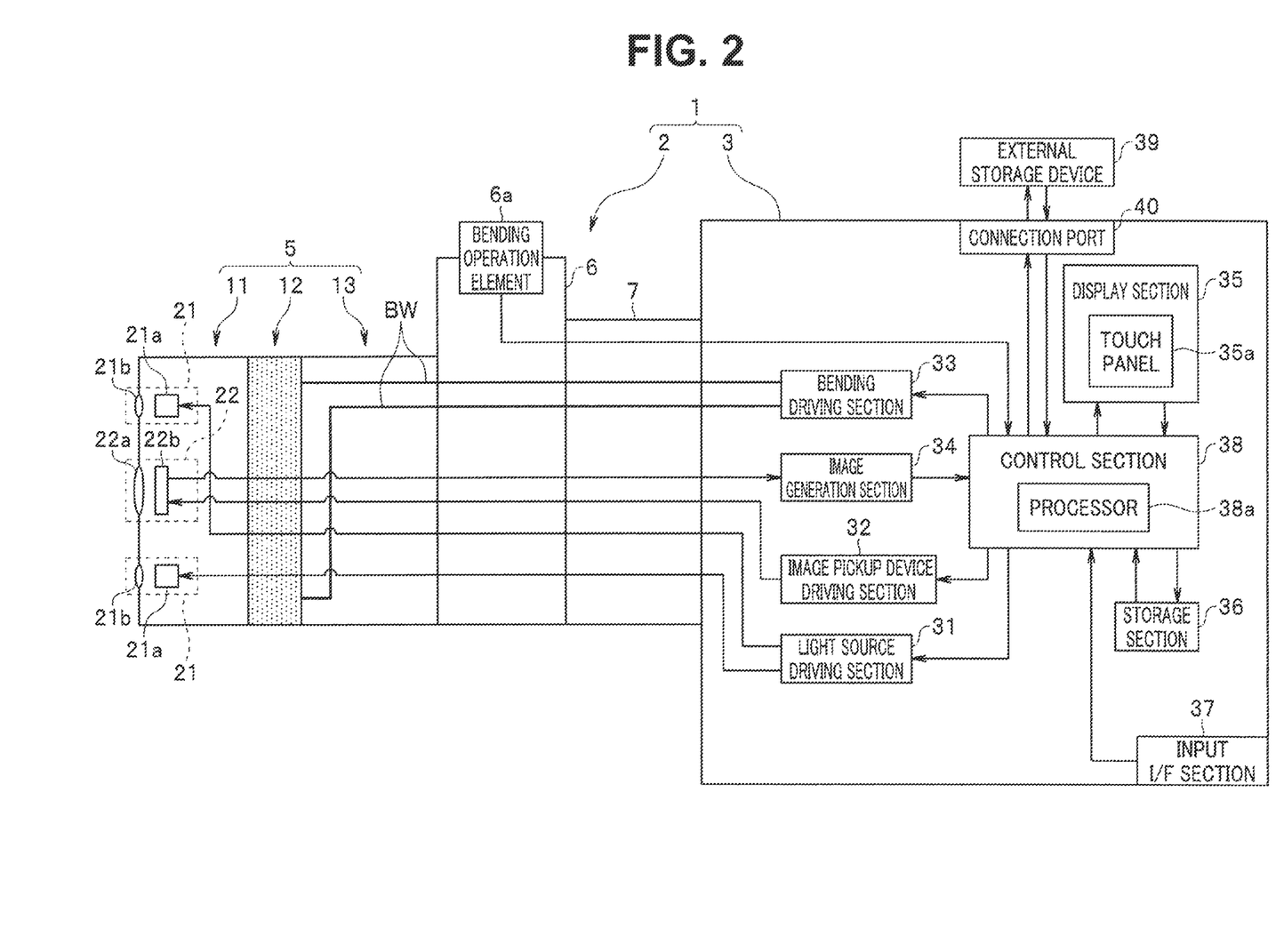
FIG. 2 is a block diagram for explaining a configuration of an endoscope system according to the embodiment.

As illustrated in FIG. 2, the distal end portion 11 includes one or more light source sections 21, and an image pickup section 22. Note that FIG. 2 illustrates an example in which the two light source sections 21 are disposed in the distal end portion 11, for the convenience of illustration. FIG. 2 is a block diagram for explaining the configuration of the endoscope system according to the embodiment.

Each of the light source sections 21 includes a light-emitting element 21a and an illumination optical system 21b.

The light-emitting element 21a includes an LED, for example. In addition, the light-emitting element 21a is configured to generate illumination light having a light amount corresponding to a light-emitting element driving signal supplied from the main body apparatus 3.

The illumination optical system 21b is configured as an optical system including an illumination lens, for example. In addition, the illumination optical system 21b is configured to irradiate an object located outside the distal end portion 11 with the illumination light emitted from the light-emitting element 21a.

The image pickup section 22 is configured as a camera including an observation optical system 22a and an image pickup device 22b.

The observation optical system 22a is configured as an optical system including an image-forming lens, for example. The observation optical system 22a is configured to receive return light (reflected light) that is emitted from the object located outside the distal end portion 11 in response to the irradiation of the illumination light from the light source section 21, and to form an image of the return light on an image pickup surface of the image pickup device 22b.

The image pickup device 22b includes an image sensor such as a CCD or a CMOS. Further, the image pickup device 22b is configured to be driven in response to an image pickup device driving signal supplied from the main body apparatus 3. Furthermore, the image pickup device 22b is configured to generate an image pickup signal by picking up the image of the return light that is formed by the observation optical system 22a, and output the generated image pickup signal to the main body apparatus 3.

The bending portion 12 includes a plurality of bending pieces, for example. In addition, the bending portion 12 is connected to distal end portions of a plurality of bending wires BW inserted through the flexible tube portion 13, the operation portion 6, and the universal cord 7. The bending portion 12 is bent according to the pulling state of each of the plurality of bending wires BW, to thereby be capable of directing the distal end portion 11 in a direction intersecting the direction of the longitudinal axis of the insertion portion 5.

Thus, the endoscope 2 is configured to pick up the image of the inside of the object to be inspected by the image pickup section 22 provided in the distal end portion 11 of the elongated insertion portion 5.

As illustrated in FIG. 2, the main body apparatus 3 includes a light source driving section 31, an image pickup device driving section 32, a bending driving section 33, an image generation section 34, the display section 35, a storage section 36, an input I/F (interface) section 37, and a control section 38. Furthermore, the main body apparatus 3 is provided with the connection port 40 for connecting a portable external storage device 61 such as a USB memory. Note that the connection port 40 is also connectable with the communication cable (not illustrated), to thereby enable data transmission and reception between the endoscope system 1 and the image processing system 51 via the communication cable.

The light source driving section 31 includes a light source driving circuit, for example. Furthermore, the light source driving section 31 is controlled by the control section 38 and configured to generate a light-emitting element driving signal for driving the light-emitting element 21a and output the generated light-emitting element driving signal.

The image pickup device driving section 32 includes an image pickup device driving circuit, for example. Furthermore, the image pickup device driving section 32 is controlled by the control section 38 and configured to generate an image pickup device driving signal for driving the image pickup device 22b and output the generated image pickup device driving signal.

The bending driving section 33 includes a motor, and the like, for example. The bending driving section 33 is connected to the proximal end portions of the plurality of bending wires BW. Furthermore, the bending driving section 33 is controlled by the control section 38 and configured to be capable of individually changing the pulling amounts of the plurality of bending wires BW. In other words, the bending driving section 33 is controlled by the control section 38 and configured to be capable of changing the pulling state of each of the plurality of bending wires BW.

The image generation section 34 is configured of an integrated circuit such as a Field Programmable Gate Array (FPGA). The image generation section 34 is configured to generate endoscopic images by performing predetermined signal processing on the image pickup signals outputted from the image pickup device 22b, and sequentially output the generated endoscopic images to the control section 38.

The display section 35 includes a liquid crystal panel, for example. In addition, the display section 35 is configured to display, on a display screen, a display image outputted from the control section 38. The display section 35 includes a touch panel 35a that detects touch operation on a graphical user interface (GUI) button and the like that are displayed on the display screen and outputs, to the control section 38, an instruction corresponding to the detected touch operation.

The storage section 36 includes, for example, a storage medium such as a memory. The storage section 36 stores, for example, a program to be used for controlling respective sections in the endoscope system 1 and various programs corresponding to various operations of the control section 38. In addition, the storage section 36 can store, for example, the endoscopic images generated by the image generation section 34.

The input I/F section 37 includes switches with which instructions corresponding to input operations by a user can be given to the control section 38.

The control section 38 includes, for example, one or more processors 38a such as a CPU. The control section 38 is configured to be capable of controlling the light source driving section 31 and the image pickup device driving section 32 based on the instructions given according to the operation on the touch panel 35a or the operation of the input I/F section 37. Furthermore, the control section 38 can control the bending driving section 33 to cause the bending portion 12 to bend based on the instruction given according to the operation of the bending operation element 6a. The control section 38 can generate a display image in which the GUI button and the like are superimposed on the endoscopic image outputted from the image generation section 34, and output the generated display image to the display section 35. Furthermore, the control section 38 can encode the endoscopic image outputted from the image generation section 34 using a format for still images, such as JPEG, and a format for moving images, such as MPEG4, and cause the external storage device 61 to store the encoded endoscope image. Further, the control section 38 can read the image stored in the external storage device 61 based on the instruction given according to the operation on the touch panel 35a or the operation of the input I/F section 37, to generate a display image corresponding to the read image and output the generated display image to the display section 35. Furthermore, the control section 38 can perform predetermined image processing on the display image to be outputted to the display section 35. The predetermined processing includes color space conversion, interlaced/progressive conversion, gamma correction, etc.

In the present embodiment, the processor 38a may perform processing, operation, and the like similar to those performed by the control section 38, by executing the program read from the storage section 36. Furthermore, in the present embodiment, the control section 38 may be configured by including, for example, an integrated circuit such as an FPGA, instead of the processor 38a.

The image processing system 51 includes a processor 52, a storage device 53, and a communication unit 54. The processor 52 includes a central processing unit (hereinafter, referred to as CPU) 52a, and a hardware circuit 52b such as ROM, RAM, and the like. Note that the processor 52 may include an integrated circuit such as an FPGA, instead of, or separately from the CPU.

The storage device 53 stores various kinds of software programs. Each of the software programs is read and executed by the CPU 52a in the processor 52. Note that all or some of the various kinds of programs may be stored in the ROM in the processor 52.

The storage device 53 stores a program to be used for operation control of the image processing system 51 and a program for performing processing related to three-dimensional reconstruction (hereinafter, referred to as 3D reconstruction processing) of the object to be inspected. The storage device 53 also stores various kinds of setting values, parameters, etc., which are necessary for the 3D reconstruction processing of the object to be inspected. Further, the storage device 53 can store the endoscopic images and the like acquired from the external apparatus such as the endoscope system 1. Furthermore, the storage device 53 stores results of the 3D reconstruction processing (hereinafter, referred to as 3D reconstruction results) of the object to be inspected. The 3D reconstruction results stored in the storage device 53 are accessible by the external apparatus such as the endoscope system 1 via the communication unit 54.

Figure 3:
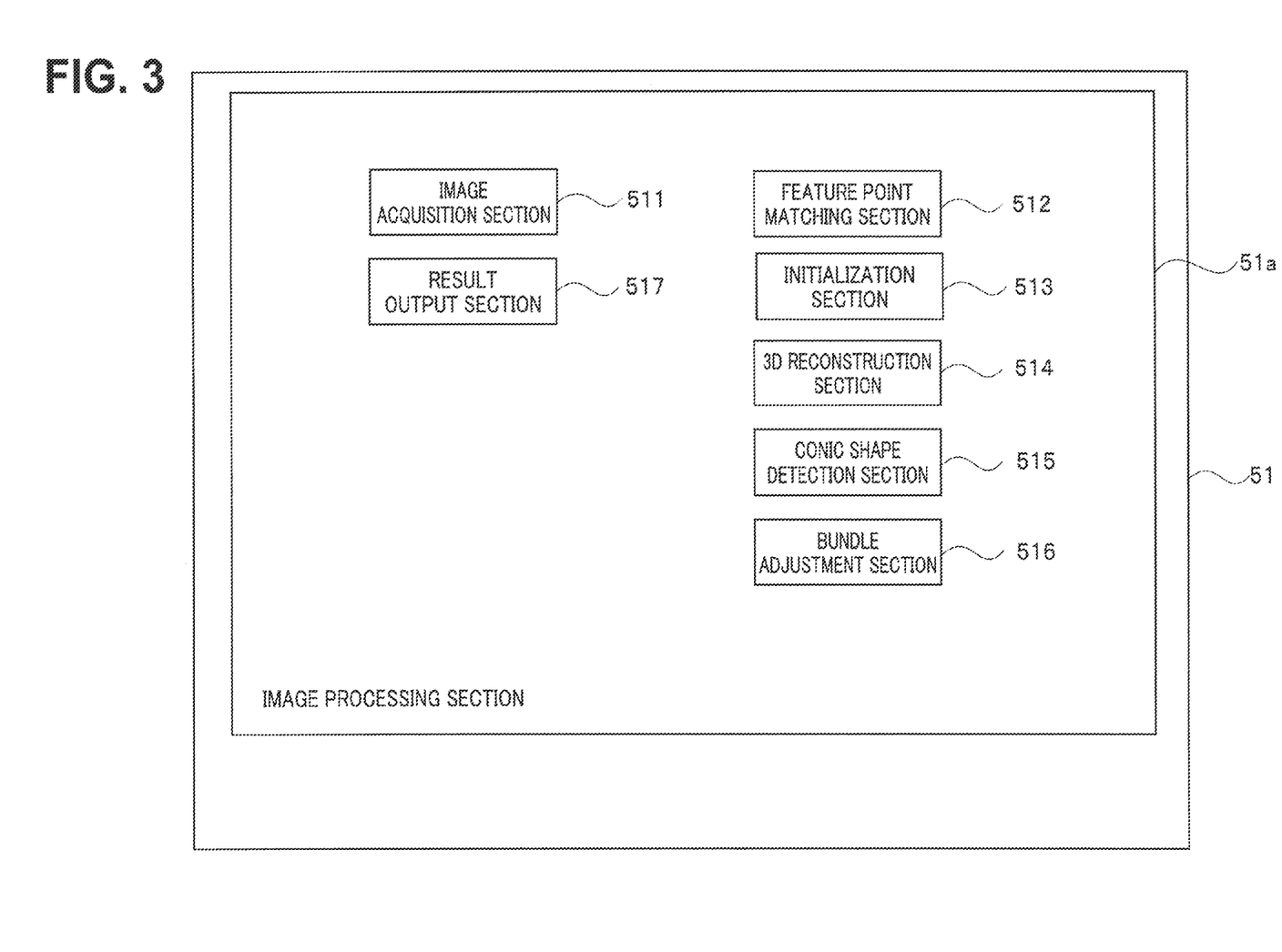
FIG. 3 is a block diagram for explaining a functional configuration of the image processing system according to the embodiment.

FIG. 3 is a block diagram for explaining the functional configuration of the image processing system according to the embodiment. FIG. 3 illustrates only the functional configuration related to the 3D reconstruction processing of a pipe, as the object to be inspected, which is performed by using input images. Note that, in the present embodiment, description will be made below on the case where the 3D reconstruction processing is performed by using the incremental SfM method.

The 3D reconstruction processing of the pipe is performed in the image processing section 51a provided in the image processing system 51. The image processing section 51a includes an image acquisition section 511, a feature point matching section 512, an initialization section 513, a 3D reconstruction section 514, and a conic shape detection section 515, a bundle adjustment section 516, and a result output section 517.

The image acquisition section 511 acquires, in time series, photographed images of the pipe, such as endoscopic images of the pipe that are sequentially picked up in the endoscope system 1. The photographed images are sequentially acquired in time series at a certain time interval. The photographed images of the pipe may be acquired from the endoscope system 1 in real time during the inspection of the pipe, or the time-series photographed images acquired and stored in the past inspections may be acquired from the external storage device, the storage device 53, etc. The file format and the sampling rate of the photographed images are not specifically limited. In the description below, each of the individual photographed images inputted in time series is indicated as a frame. In addition, times at which the photographed images are picked up in the endoscope system 1 are denoted by the numbers such as 0, 1, 2, . . . , t−1, t, t+1, . . . in the order of image pickup. The photographed image at the time t is referred to as a frame t.

The feature point matching section 512 extracts image local features from each of the frames acquired by the image acquisition section 511, as two-dimensional feature points (hereinafter, referred to as 2D feature points), by using an algorithm such as Scaled Invariance Feature Transform (SIFT), for example. A large number of 2D feature points are usually extracted in each of the frames. The plurality of extracted 2D feature points are referred to as a group of 2D feature points. Then, matching of the 2D feature points is performed between a plurality of frames (frame t−1 and frame t, for example).

The initialization section 513 selects two frames as an initial image pair. For example, the initialization section 513 selects, as the initial image pair, the frame whose frame number is the smallest and the frame whose frame number is the second smallest. Then, the initialization section 513 uses the initial image pair to estimate the camera positions/poses of the initial image pair in the 3D space. The camera positions/poses are estimated by using an algorithm for estimating relative camera positions/poses (rotational motion and translation motion in the 3D space) between the two frames based on the correspondence of five or more points between the two frames, for example. In addition, the initialization section 513 calculates the coordinates of the 2D feature points in the 3D space (3D-point coordinates), based on pieces of information including the camera positions/poses estimated in the initial image pair, the correspondence of the 2D feature points in the initial image pair, the coordinates of the 2D feature points on the photographed image in each of the frames of the initial image pair. In the calculation of the 3D-point coordinates, a general 3D coordinates calculation method such as triangulation is used. The 3D points corresponding respectively to the plurality of 2D feature points included in the group of 2D feature points are referred collectively as a group of 3D points. Note that the selection method of the initial image pair, the estimation method of the camera positions/poses, the coordinates calculation method of the 3D points, and the like in the initialization are not limited to the above-described methods, but various stabilization methods may be used as recited in the prior art document.

The 3D reconstruction section 514 estimates, based on the information on the correspondence between the 2D feature points in an input frame (frame t, for example) and already reconstructed 3D points, the camera position/pose in the input frame. Such estimation of the camera position/pose can be performed by solving, for example, a Perspective-n-Points (PnP) problem as a known method. Furthermore, the 3D reconstruction section 514 calculates 3D-point coordinates by using the input frame, to reconstruct new 3D points.

The conic shape detection section 515 as an estimation section detects a conic shape using the group of 3D points including the new 3D points. In the processing related to the general incremental SfM, scale-drifting occurs due to the accumulation of sequential errors, which causes a large error and a distortion in the 3D reconstruction results. In order to address such a problem, the present embodiment focuses on the fact that the object to be inspected is a pipe, that is, a cylinder having a constant inner diameter, to correct the positions of the 3D points by utilizing that the 3D points are located on the inner wall of the cylinder. A conic shape (cone) is detected in the input frame, to estimate an axis of the cone (line connecting the apex and the center of the bottom circle of the cone) as a center axis of the pipe. Then, the 3D points are fitted to the positions at the distance of the radius (inner diameter) of the pipe from the axis of the cone, to thereby suppress the scale-drifting. Note that, in the present embodiment, the conic shape is detected for stably estimating the center axis of the cylindrical shape as the shape of the pipe, even when a scaling occurs in the group of 3D points due to scale-drifting. However, instead of the conic shape, another shape such as a cylinder in which the center axis can be specified may be detected. In addition, since the pipe is elongated, a principal component analysis (PCA) may be applied to the group of 3D points by using the longitudinal direction of the pipe, to set the major axis of the pipe as the center axis.

The conic shape detection section 515 performs conic shape detection and belonging determination. First, description will be made on the conic shape detection. The conic shape detection is performed by using the method disclosed, for example, in D. Lopez-Escogido and L. G. de la Fraga, "Automatic extraction of geometric models from 3D point cloud datasets," in Proc. Electrical Engineering, Computing Science and Automatic Control (CCE), 2014, for example. If a 3D point in the homogeneous coordinate system $X=[x, y, z, 1]^T$ satisfies Equation (1) below, the 3D point is supposed to represent the surface of the cone.

$$X^T C X = 0 \qquad \text{Equation (1)}$$

Note that C is a symmetric matrix, which can be decomposed as shown in Equation (2) below.

$$C = \begin{bmatrix} R^T D R & R^T D t \\ t^T D R & t^T D t \end{bmatrix}, D = \text{diag}(-c^2, -c^2, 1) \qquad \text{Equation (2)}$$

Note that c is a constant (parameter) representing the slope of the cone. In addition, [R, t] represents 3D rotation and translation motion that represent the coordinate transformation which aligns z-axis to the major axis of the cone. In other words, [R, t] represents the axis of the detected cone (line connecting the apex and the center of the bottom circle of the cone). Equation (1) shown above can be rewritten by Equation (3) below.

$$\text{verh}^T(XX^T)\text{vech}(C)=0 \qquad \text{Equation (3)}$$

Note that verh( ) is the half vectorization transformation of a symmetric matrix that is obtained by vectorizing the lower triangular part of the matrix. Minimal solution for Equation (3) is therefore given by nine points. The newly reconstructed 3D points are thus fitted, to thereby detect the conic shape and calculate the axis of the cone. In order to reduce the influence of the noise points, a RANSAC method is used. The RANSAC method is disclosed, for example, in M. A. Fischler and R. C. Bolles, "Random sample consensus: a paradigm for model fitting with applications to image analysis and automated cartography," Comm. ACM, vol. 24, no. 6, pp. 381-395, 1981. The detected conic shape is registered as a cone model. Note that, when the pipe as the object to be inspected is configured by combining a plurality of straight pipes, a plurality of different conic shapes corresponding to the respective straight pipes are detected. In such a case, an identifier (ID, etc.) is assigned to each of the cone models. A different identifier is assigned to each of the cone models corresponding to different conic shapes. For example, the cone model detected and registered first after the start of inspection is assigned with ID=0. Every time a different cone model is registered, ID number is incremented to be assigned to the registered cone model in such a manner as to assign ID=1 to a cone model newly detected and registered next to the first one, ID=2 to a cone model detected and registered after the next, . . . .

Next, description will be made on the belonging determination. The belonging determination is a determination on whether the input frame belongs to an already detected conic shape. Specifically, the determination is made based on the number or the ratio of the 3D points determined to be located on the inner surface of the already detected conic shape (the number or the ratio of inliers of the 3D points for the already detected conic shape) among the plurality of 3D points reconstructed in the input frame. When the number or the ratio of the inliers exceeds a predetermined threshold, the frame is determined to belong to the already detected conic shape. When the number or the ratio of the inliers is equal to or smaller than the predetermined threshold, the frame is determined not to belong to the already detected conic shape. The frame and the 3D points that have been determined to belong to the already detected conic shape are associated with the ID assigned to the cone model corresponding to the conic shape to which the frame and the 3D points belong. Note that the belonging determination may be made based on the number or the ratio of the 3D points that are determined not to be located on the inner surface of the already detected conic shape (the number or the ratio of outliers of the 3D points for the already detected conic shape) among the plurality of 3D points reconstructed in the input frame.

The bundle adjustment section 516 corrects the reconstructed 3D points and the camera positions/poses. The bundle adjustment section 516 suppresses the scale-drifting by simultaneously minimizing (optimizing) a reprojection error and an error between the cylinder and the reconstructed 3D points, to thereby reduce the error caused by the reconstruction. Specifically, the bundle adjustment section 516 corrects the reconstructed 3D points and the camera positions/poses so as to minimize Equation (4) below.

$$E(X,P,K,C) = E_{rep}(X,P,K) + \alpha E_{cyl}(X,C) \quad \text{Equation (4)}$$

Note that X, P, K and C are variables that indicate the coordinates of the 3D points, the camera positions/poses of the registered images, the camera intrinsic parameters, and the detected conic shape parameters, respectively. The right-side first term Erep(X, P, K) in Equation (4) is the reprojection error term to be used in a general bundle adjustment. The right-side second term Ecly(X, C) in Equation (4) is a cylinder constraint term. α is a constant scalar which controls the weights of the reprojection error term and the cylinder constraint term.

The reprojection error term is represented as Equation (5) shown below.

$$E_{rep}(X,P,K) = \Sigma_{i \in P} \Sigma_{j \in X} \rho(\|q_{ij} - \pi(P_i, K_i, X_j)\|) \quad \text{Equation (5)}$$

Note that ρ is the robust function, and qij represents the 2D point corresponding to Xj (Xj represents the j-th 3D point). In addition, π(Pi, Ki, Xj) is a function that projects the 3D points to the image plane, Pi represents the i-th camera pose, and Ki represents the i-th camera intrinsic parameter. In other words, the reprojection error is a difference between the 2D coordinates of the feature points on the image and the 2D coordinates obtained by reprojecting, on the image, the 3D points which have been obtained as a result of the 3D reconstruction of the feature points. The smaller the value of the reprojection error term is, the higher the estimation accuracy of the camera positions/poses and the reconstruction accuracy of the 3D points are.

The cylinder constraint term is represented as Equation (6) shown below.

$$E_{cly}(X,C;r) = \Sigma_i \Sigma_j \rho(\|r - d(X_j, [R_i, t_i])\|) \quad \text{Equation (6)}$$

Figure 4:
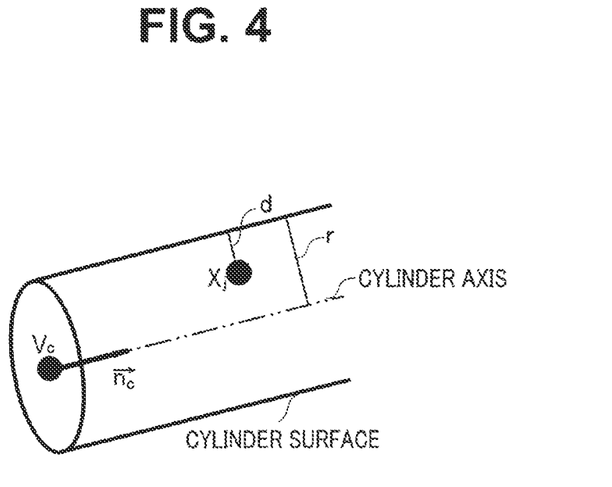
FIG. 4 is a view for explaining a cylinder constraint term of an error function to be used for bundle adjustment.

Note that r is a known cylinder radius value (the radius of the pipe, a distance from the center axis to the inner surface of the cylinder). d(Xj, [Ri, ti]) is the function for calculating a distance of Xj as the j-th 3D point from the cylinder axis, and [Ri, ti] represents the axis of the detected cone. Here, description will be made on the specific calculation method of the function d, with reference to FIG. 4. FIG. 4 is a view for explaining the cylinder constraint term of the error function to be used for bundle adjustment. In FIG. 4, the bold line indicates the surface of the cylinder obtained by modeling the pipe as the object to be inspected. The straight line shown by the two-dot-chain line indicates the center axis (cylinder axis) in the extending direction of the cylinder. The center axis (cylinder axis) is the same as the axis of the cone detected previously. In addition, Vc represents any point on the cylinder axis, and the vector nc represents a unit vector in the direction of the cylinder axis.

In FIG. 4, the distance d of the 3D point Xj from the cylinder axis is calculated by the exterior product of the vector VcXj and the vector nc. In other words, the function d is represented by Equation (7) shown below.

$$d(X_j,[R_i,t_i]) = \|\overrightarrow{V_c X_j} \times \overrightarrow{n_c}\| \quad \text{Equation (7)}$$

The smaller the difference between the known cylinder radius value r used as a reference scale and the distance d of the 3D point Xj from the cylinder axis which is calculated by Equation (7) is, the higher the reconstruction accuracy of the 3D point is.

The bundle adjustment section 516 performs bundle adjustment on the frame and 3D points that belong to any of the already detected cone models, by using Equation (4) (equation including the reprojection error term and the cylinder constraint term). On the other hand, the bundle adjustment section 516 performs bundle adjustment on the frame and 3D points that do not belong to any of the cone models, by using Equation (5) (equation including only the reprojection error term). In other words, with regard to the frame and the 3D points that belong to any of the cone models, the camera positions/poses and the 3D-point coordinates are corrected such that not only the reprojection error but also the total sum of the errors between the known scale (distance from the center axis, which is parallel to the pipe extending direction, to the inner surface of the cylindrical pipe) and the respective distances of the reconstructed 3D points from the cylinder axis are minimized. Accordingly, the scale-drifting can be suppressed, to thereby be capable of preventing the shape of the reconstructed pipe from being tapered, and reducing the deviation of the extending direction. As a result, accurate 3D reconstruction can be performed.

Each time the bundle adjustment for one frame ends, the result output section 517 outputs the 3D reconstruction results (specifically, the 3D-point coordinates and camera position/pose after the bundle adjustment) to the storage device 53, the endoscope system 1, the external storage device, and the like.

Figure 5:
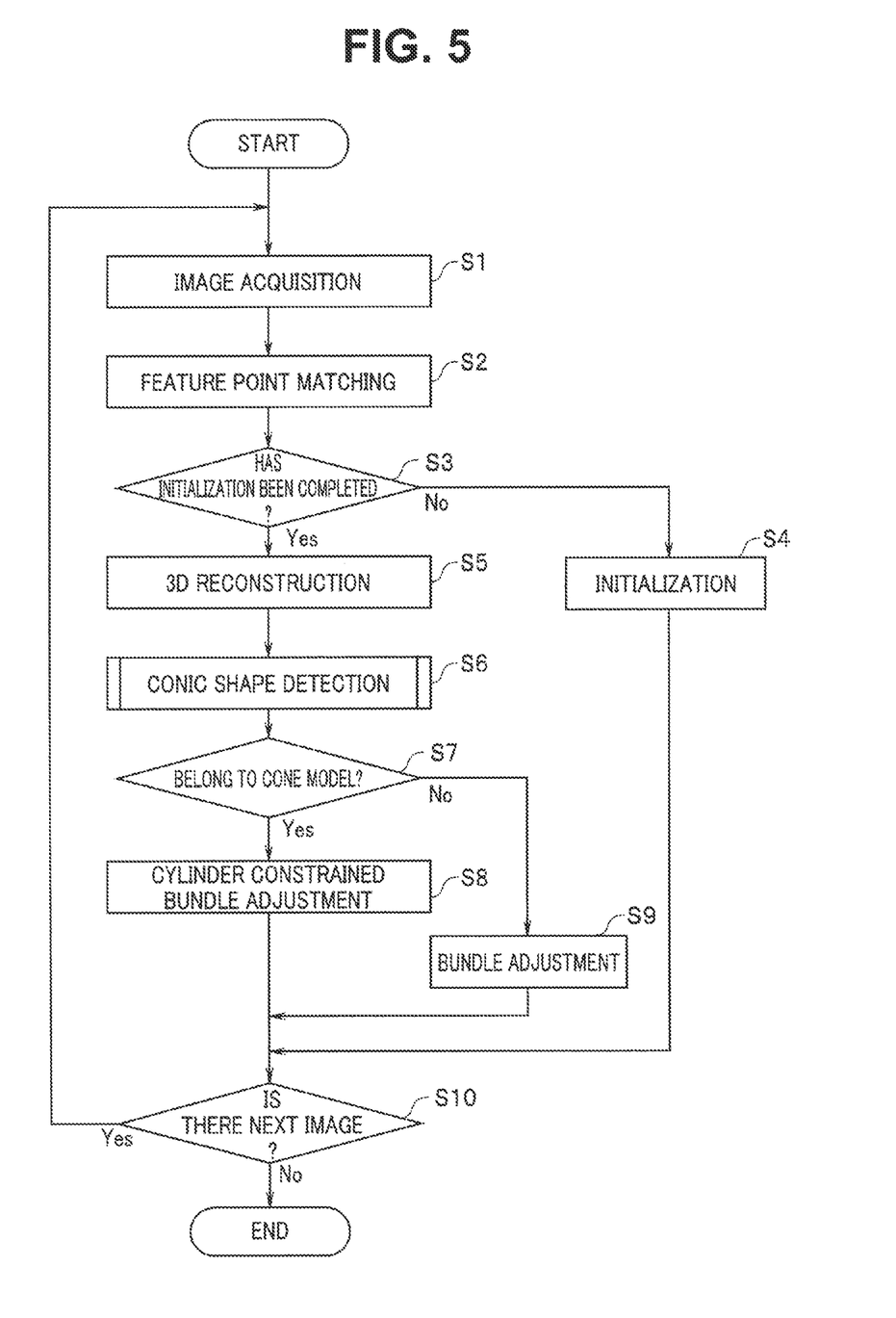
FIG. 5 is a flowchart for explaining processing, etc., performed in the image processing system according to the embodiment.

Description will be made on details of the 3D reconstruction processing in the image processing system 51 configured as described above, with reference to FIG. 5. FIG. 5 is a flowchart for explaining the processing, etc., performed in the image processing system according to the embodiment.

The image acquisition section 511 acquires, in time series, the photographed images of the pipe obtained by sequentially picking up the images of the pipe in the endoscope system 1 (FIG. 5, step S1). When the image acquisition section 511 acquires at least first two frames (frame 0 and frame 1), the feature point matching section 512 extracts 2D feature points from the frame inputted last and the frame inputted immediately before the last, to match the extracted 2D points with each other (FIG. 5, step S2).

When the camera positions/poses have not been estimated (FIG. 5, step S3, No), the initialization section 513 selects the inputted two frames in which the 2D feature points are matched with each other, to perform initialization (FIG. 5, step S4). Specifically, the initialization section 513 sets the selected two frames as an initial image pair, to estimate the camera positions/poses of the initial image pair in the 3D space. Furthermore, the initialization section 513 calculates the coordinates of the 2D feature points in the 3D space (3D-point coordinates).

After the end of the initialization in the step S4, if there is a non-acquired image that is a processing target (FIG. 5, step S10, Yes), the process returns to the step S1 in which the next frame (frame 2) is acquired. Subsequently, the feature point matching section 512 extracts the 2D feature points in the acquired frame, to match the 2D feature points in the acquired frame with the 2D feature points in the frame acquired immediately before (FIG. 5, step S2).

Since the initialization such as the estimation of the camera positions/poses has already been completed (FIG. 5, step S3, Yes), the 3D reconstruction section 514 estimates the camera position/pose in the latest acquired frame based on the information on the correspondence between the 2D feature points in the latest acquired frame and the already reconstructed 3D points. In addition, the 3D reconstruction section 514 calculates the 3D-point coordinates using the input frame, to reconstruct new 3D points (FIG. 5, step S5).

Figure 6:
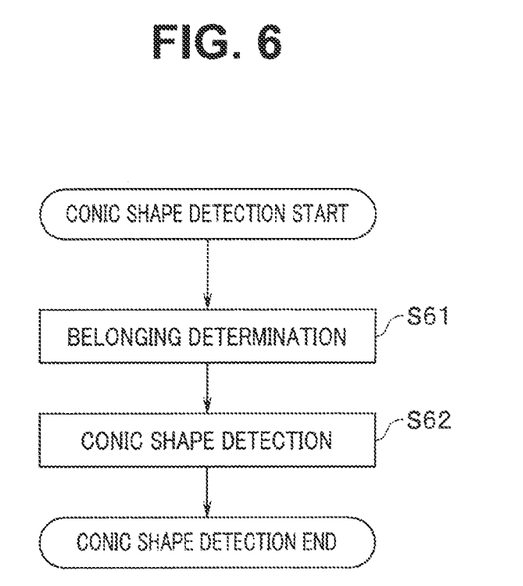
FIG. 6 is a flowchart for explaining conic shape detection processing in FIG. 5.

Subsequently, the conic shape detection section 515 detects a conic shape using the 3D points detected in the input frame (FIG. 5, step S6). The specific procedure of the conic shape detection processing in the step S6 will be described using the flowchart illustrated in FIG. 6. FIG. 6 is the flowchart for explaining the conic shape detection processing in FIG. 5.

First, the conic shape detection section 515 performs belonging determination (FIG. 6, step S61). At the time of the processing of the frame 2, the conic shape detection has not been performed yet, and the conic shape itself is not detected. In other words, there is no conic shape as an object for which the belonging determination is performed. Accordingly, the belonging determination result is "the frame does not belong to conic shape". If one or more conic shapes have already been detected from one or more other frames and registered as one or more cone models, the belonging determination is performed to determine whether the 3D points reconstructed in the step S5 belong to any of the one or more registered cone models. The belonging determination is made based on the number or the ratio of the inliers of the reconstructed 3D points for any of the cone models. When the number or the ratio of the inliers is larger than the threshold set as a reference, the latest acquired frame is determined "to belong to conic shape". In this case, the frame and the 3D points which are inliers are labeled with the ID of the cone model to which the frame and the 3D points belong, to clarify the belonging relation. On the other hand, the number or the ratio of the inliers is equal to or smaller than the threshold set as the reference, the frame is determined "not to belong to conic shape". Although the belonging determination is made based on the conic shape in the present embodiment, the belonging determination may be made based on the cylinder including the cylinder radius value and the estimated center axis.

Next, the conic shape detection section 515 performs conic shape detection (FIG. 6, step S62). With regard to the frame that is determined "not to belong to conic shape" in the step S61, a new conic shape detection is performed on the 3D points that do not belong to any of the cone models. With regard to the newly detected conic shape, the number and the ratio of the inliers of the 3D points used for the conic shape detection are calculated. If the number or the ratio of the inliers is larger than the threshold set as the reference, it is determined that the conic shape detection has succeeded and the detected conic shape is registered as a new cone model. Then, the frame is determined "to belong to conic shape". In this case, the frame and the 3D points which are inliers are labeled with the ID of the newly registered cone model, to clarify the belonging relation.

On the other hand, with regard to the frame determined "to belong to conic shape" in the step S61, the 3D points determined to be the inliers for the cone model are extracted from the newly reconstructed 3D points in the frame. The extracted 3D points are added to the 3D points that have already been determined to belong to the cone model, and then conic shape detection is performed again, to update the conic shape parameters of the cone model.

When the procedure illustrated in the flowchart in FIG. 6 is executed and the conic shape detection processing in the step S6 in FIG. 5 is ended, the bundle adjustment section 516 determines whether the latest acquired frame belongs to any of the registered cone models (FIG. 5, step S7). When, in the step S6 in FIG. 5, the frame is determined "to belong to conic shape" (FIG. 5, step S7, Yes), the bundle adjustment section 516 performs cylinder constrained bundle adjustment on the frame and the 3D points that belong to the cone model by using Equation (4) (equation including the reprojection error term and the cylinder constraint term) (FIG. 5, step S8). On the other hand, when the frame is determined "not to belong to conic shape" (FIG. 5, step S7, No), the bundle adjustment section 516 performs bundle adjustment on the frame and the 3D points that do not belong to any of the cone models by using Equation (5) (equation only with the reprojection error term but without the cylinder constraint term) (FIG. 5, step S9).

Note that the cylinder constrained bundle adjustment in the step S8 in FIG. 5 and the bundle adjustment in the step S9 in FIG. 5 each include the following two types of bundle adjustment depending on the application ranges thereof. In other words, there are the bundle adjustment the application range of which is only a nearby range of the latest acquired frame and the bundle adjustment the application range of which is all the acquired frames. The former is called local bundle adjustment, and is normally executed at each frame acquisition. The latter is called global bundle adjustment, and is executed at a fixed interval (for example, at the timing at which a predetermined number of frames are added). Execution of the local bundle adjustment and the global bundle adjustment in combination at a proper frequency can improve the reconstruction accuracy while suppressing an increase in the processing cost.

When the cylinder constrained bundle adjustment in the step S8 in FIG. 5 or the bundle adjustment in the step S9 in FIG. 5 is ended, determination is made on whether there is a non-acquired frame which is a processing target (FIG. 5, step S10). When there is a frame as a processing target (FIG. 5, step S10, Yes), the process returns to the step S1 in which the next frame (frame 3) is acquired, and a series of processing from the step S2 to the step S8 (or the step S9)

is executed on the acquired frame. On the other hand, when the processing has been completed for all the frames and there is no frame as a processing target (FIG. 5, step S10, No), a series of processing related to the 3D reconstruction in the image processing system 51 is ended. Note that it is also possible to create a 3D shape model of the object to be inspected by performing high densification processing for integrating the 3D reconstruction results (a plurality of 3D-point coordinates and the camera positions/poses), which have been calculated by the above-described series of processing, into one.

The 3D-point coordinates and the camera positions/poses that are corrected by the bundle adjustment are outputted from the result output section 517 to the storage device 53, the endoscope system 1, the external storage device, and the like at a predetermined timing. The predetermined timing may be, for example, each timing of the end of the bundle adjustment for one frame, or may be the timing after the processing for all the frames.

Thus, according to the above-described embodiment, the bundle adjustment of the reconstructed 3D-point coordinates is performed by using not only the conditions for minimizing the reprojection error but also the cylinder constrained conditions for minimizing the errors of the respective distances from the center axis of the pipe (error from the radius (inner diameter) of the pipe) to the reconstructed 3D points. With such a configuration, the present invention is capable of providing the image processing system, the image processing method, and the image processing program that enable the highly accurate 3D reconstruction to be performed on the images obtained by picking up the image of the pipe as the object to be inspected, while suppressing the scale-drifting.

Although it is preferable that a value given in advance as a set value by an inspector or the like is used as the cylinder radius value r to be used in the cylinder constrained conditions in the bundle adjustment, a value estimated by the conic shape detection section 515 may be used. An example of the value is the one estimated by the conic shape detection section 515 based on the distance between the reconstructed 3D-point coordinates and the axis of the cone (estimated center axis) at the early stage of the above-described 3D reconstruction processing.

In addition, as illustrated in FIG. 1, the image processing system 51 may be connected to a server 81 on a cloud 80 via a network including the Internet 70, and one or more functions of the image processing section 51a in the image processing system 51 may be executed on the server 81. The image processing system 51 may be connected to the storage device 61 and configured to be capable of acquiring inputted images from the storage device 61 and outputting the 3D reconstruction results to the storage device 61. In such a case, the image processing system 51 may be connected directly to the storage device 61 or may be connected to the storage device 61 so as to be capable of transmitting and receiving information via the network including a communication network such as the Internet 70, LAN, WIFI, or the like.

The present invention is not limited to the above-described embodiment, but various changes, modifications, and the like are possible without changing the gist of the present invention.

What is claimed is:

1. An image processing system that estimates a position and a pose of a camera and performs three-dimensional reconstruction processing of an object having a cylindrical shape, by using a photographed image acquired by photographing an inside of the object with the camera, the image processing system comprising a processor, the processor being configured to:
estimate a first center axis of the cylindrical shape by using a group of three-dimensional points obtained by reconstructing, in a three-dimensional space, a group of feature points extracted from the photographed image; and
perform bundle adjustment for correcting the position and the pose of the camera and coordinates of the group of three-dimensional points by using a condition for minimizing a total sum of differences between a radius of the cylindrical shape and respective distances from the first center axis to individual three-dimensional points that constitute the group of three-dimensional points.

2. The image processing system according to claim 1, wherein the processor is further configured to:
extract, from the group of three-dimensional points, a three-dimensional point whose distance from the first center axis has a difference from the radius, the difference being within a predetermined range, or a three dimensional point whose distance from the first center axis has a difference, the difference being out of the predetermined range; and
determine whether to estimate a second center axis different from the first axis based on at least one of a number of the extracted three-dimensional points or a ratio of the extracted three-dimensional points to the group of three-dimensional points.

3. The image processing system according to claim 1, wherein the processor detects a conic shape from the group of three-dimensional points, and detects the first center axis from the detected conic shape.

4. The image processing system according to claim 1, wherein the radius has a value set in advance based on an actual measurement value of the object.

5. The image processing system according to claim 1, wherein the radius has a value estimated by the processor.

6. An image processing method for estimating a position and a pose of a camera and performing three-dimensional reconstruction processing of an object having a cylindrical shape, by using a photographed image acquired by photographing an inside of the object with the camera, the image processing method comprising:
estimating a first center axis of the cylindrical shape by using a group of three-dimensional points obtained by reconstructing, in a three-dimensional space, a group of feature points extracted from the photographed image; and
correcting the position and the pose of the camera and coordinates of the group of three-dimensional points by using a condition for minimizing a total sum of differences between a radius of the cylindrical shape and respective distances from the first center axis to individual three-dimensional points that constitute the group of three-dimensional points.

7. A non-transitory computer-readable storage medium that stores an image processing program for estimating a position and a pose of a camera and performing three-dimensional reconstruction processing of an object having a cylindrical shape, by using a photographed image acquired by photographing an inside of the object with the camera, the image processing program causing a computer to execute:
estimating a first center axis of the cylindrical shape by using a group of three-dimensional points obtained by reconstructing, in a three-dimensional space, a group of feature points extracted from the photographed image; and correcting the position and the pose of the camera and coordinates of the group of three-dimensional points by using a condition for minimizing a total sum of differences between a radius of the cylindrical shape and respective distances from the first center axis to individual three-dimensional points that constitute the group of three-dimensional points.

* * * * *